US012641621B2

(12) United States Patent
Liu et al.

(10) Patent No.: US 12,641,621 B2
(45) Date of Patent: May 26, 2026

(54) DYNAMIC COMMON BEAM SWITCHING FOR DL RECEPTION

(71) Applicant: Lenovo (Beijing) Limited, Beijing (CN)

(72) Inventors: Bingchao Liu, Beijing (CN); Chenxi Zhu, Fairfax, VA (US); Wei Ling, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 346 days.

(21) Appl. No.: 18/268,543

(22) PCT Filed: Dec. 22, 2020

(86) PCT No.: PCT/CN2020/138213
§ 371 (c)(1),
(2) Date: Jun. 20, 2023

(87) PCT Pub. No.: WO2022/133701
PCT Pub. Date: Jun. 30, 2022

(65) Prior Publication Data
US 2024/0314804 A1     Sep. 19, 2024

(51) Int. Cl.
*H04L 5/00*          (2006.01)
*H04W 72/232*      (2023.01)

(52) U.S. Cl.
CPC ......... *H04W 72/232* (2023.01); *H04L 5/0053* (2013.01)

(58) Field of Classification Search
CPC ... H04L 5/0053; H04L 5/0035; H04W 72/232
See application file for complete search history.

(56) References Cited

U.S. PATENT DOCUMENTS

| | | | | |
|---|---|---|---|---|
| 2019/0222289 A1* | 7/2019 | John Wilson | ......... | H04L 5/0073 |
| 2019/0356455 A1* | 11/2019 | Yang | ..................... | H04L 1/1812 |
| 2020/0153666 A1* | 5/2020 | Khoshnevisan | ...... | H04L 5/0035 |
| 2020/0229161 A1* | 7/2020 | Raghavan | ............. | H04W 24/10 |
| 2021/0321412 A1* | 10/2021 | Sakhnini | ............. | H04W 72/535 |

(Continued)

FOREIGN PATENT DOCUMENTS

| | | |
|---|---|---|
| CN | 111148242 A | 5/2020 |
| CN | 111277387 A | 6/2020 |

(Continued)

OTHER PUBLICATIONS

PCT/CN2020/138213 , "International Preliminary Report on Patentability", PCT Application No. PCT/CN2020/138213, Jul. 6, 2023, 5 pages.

(Continued)

*Primary Examiner* — Andrew Lee
(74) *Attorney, Agent, or Firm* — FIG. 1 Patents

(57)          ABSTRACT
Methods and apparatuses for dynamic common beam (or common TCI state) switching for DL reception are disclosed. In one embodiment, a method comprises receiving a higher layer parameter to enable common TCI state for DL reception for a carrier, receiving a DCI with format 1_1 or 1_2 containing TCI field indicating a TCI state; and determining TCI state for DL reception according to the TCI state indicated by the TCI field of the DCI.

20 Claims, 4 Drawing Sheets

(56)             References Cited

U.S. PATENT DOCUMENTS

| | | | |
|---|---|---|---|
| 2021/0410145 A1* | 12/2021 | Khoshnevisan .. | H04W 72/1263 |
| 2023/0137907 A1* | 5/2023 | Fang .................... | H04L 5/0023 |
| | | | 370/329 |
| 2023/0309178 A1* | 9/2023 | Matsumura ........... | H04L 5/0087 |
| 2023/0327742 A1* | 10/2023 | Matsumura ........... | H04L 5/0064 |
| | | | 370/329 |
| 2024/0032060 A1* | 1/2024 | Matsumura ........... | H04W 76/20 |
| 2024/0098526 A1* | 3/2024 | Matsumura ........... | H04L 5/0023 |

FOREIGN PATENT DOCUMENTS

| | | | |
|---|---|---|---|
| WO | 2020089879 A1 | 5/2020 | |
| WO | 2020215107 A2 | 10/2020 | |

OTHER PUBLICATIONS

PCT/CN2020/138213 , "International Search Report and Written Opinion", PCT Application No. PCT/CN2020/138213, Sep. 24, 2021, 7 pages.

Vivo, "Discussion on multi-beam enhancement", 3GPP TSG RAN WG1 #102-e, R1-2005363, e-Meeting [retrieved Jun. 12, 2023]. Retrieved from the Internet <https://www.3gpp.org/ftp/TSG_RAN/WG1_RL1/TSGR1_102-e/Docs/>., Aug. 2020, 21 Pages.

Vivo, "Further discussion on multi beam enhancement", 3GPP TSG RAN WG1 #103-e, R1-2007644, e-Meeting [retrieved Jun. 12, 2023]. Retrieved from the Internet <https://www.3gpp.org/ftp/tsg_ran/WG1_RL1/TSGR1_103-e/Docs>., Oct. 2020, 26 Pages.

ZTE , "Enhancements on Multi-beam Operation", 3GPP TSG RAN WG1 Meeting #103-e, R1-2007763, e-Meeting [retrieved Apr. 19, 2023]. Retrieved from the Internet <https://www.3gpp.org/ftp/TSG_RAN/WG1_RL1/TSGR1_103-e/Docs>., Oct. 2020, 19 Pages.

\* cited by examiner

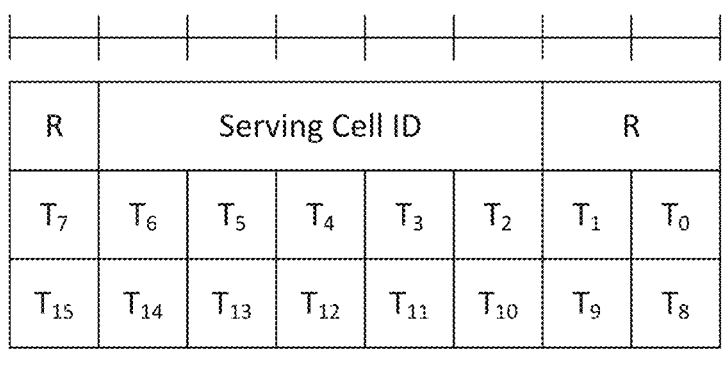

| R | Serving Cell ID | | | | | R | |
|---|---|---|---|---|---|---|---|
| $T_7$ | $T_6$ | $T_5$ | $T_4$ | $T_3$ | $T_2$ | $T_1$ | $T_0$ |
| $T_{15}$ | $T_{14}$ | $T_{13}$ | $T_{12}$ | $T_{11}$ | $T_{10}$ | $T_9$ | $T_8$ |

...

| $T_{(N-2)x8+7}$ | $T_{(N-2)x8+6}$ | $T_{(N-2)x8+5}$ | $T_{(N-2)x8+4}$ | $T_{(N-2)x8+3}$ | $T_{(N-2)x8+2}$ | $T_{(N-2)x8+1}$ | $T_{(N-2)x8}$ |
|---|---|---|---|---|---|---|---|

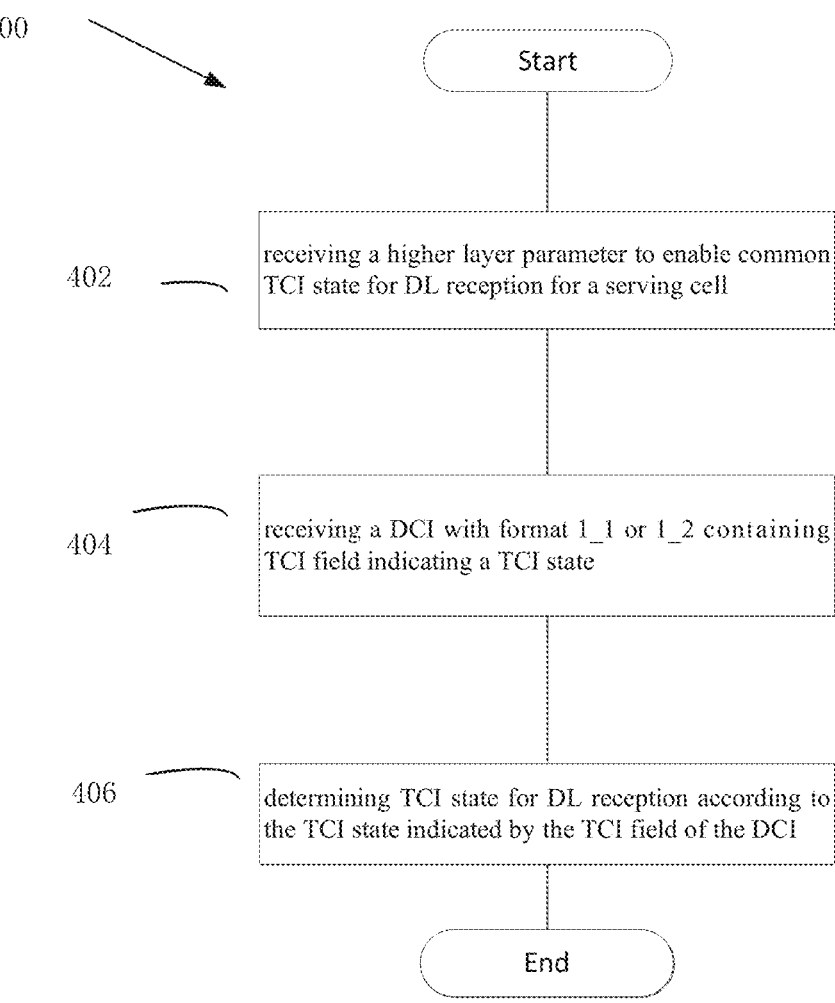

Start

402 — receiving a higher layer parameter to enable common TCI state for DL reception for a serving cell 404 — receiving a DCI with format 1_1 or 1_2 containing TCI field indicating a TCI state 406 — determining TCI state for DL reception according to the TCI state indicated by the TCI field of the DCI End

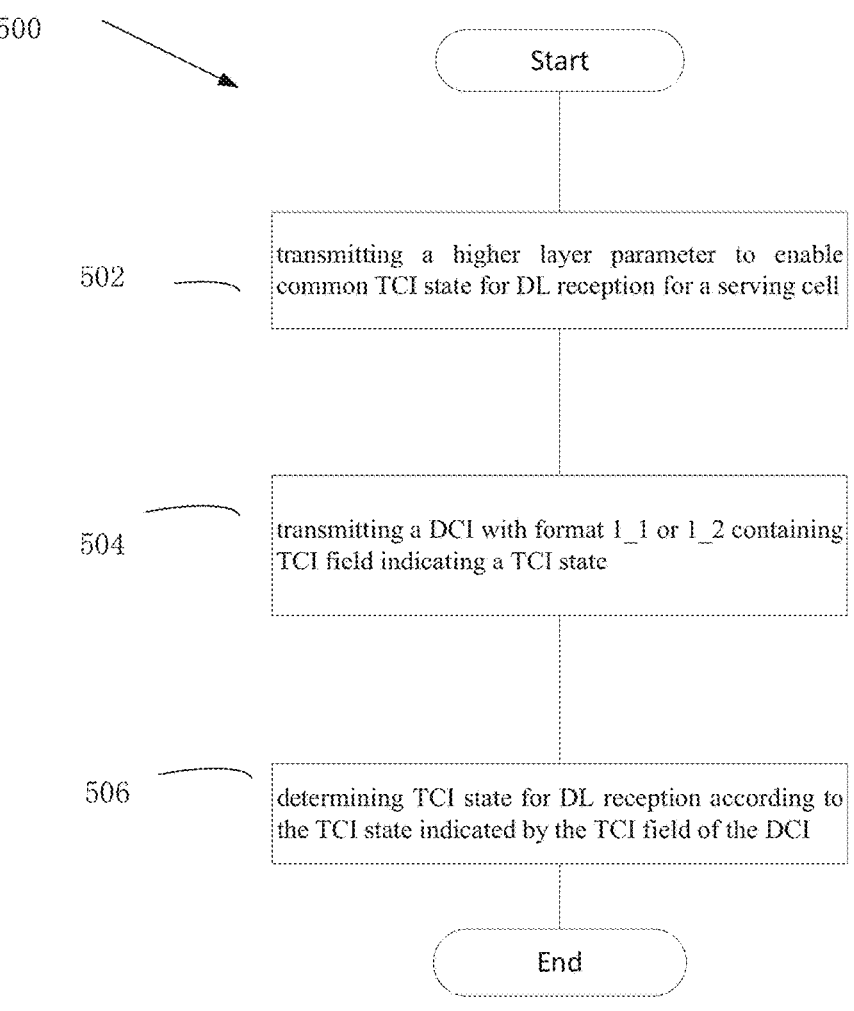

Start

502 — transmitting a higher layer parameter to enable common TCI state for DL reception for a serving cell 504 — transmitting a DCI with format 1_1 or 1_2 containing TCI field indicating a TCI state 506 — determining TCI state for DL reception according to the TCI state indicated by the TCI field of the DCI End

Figure 5

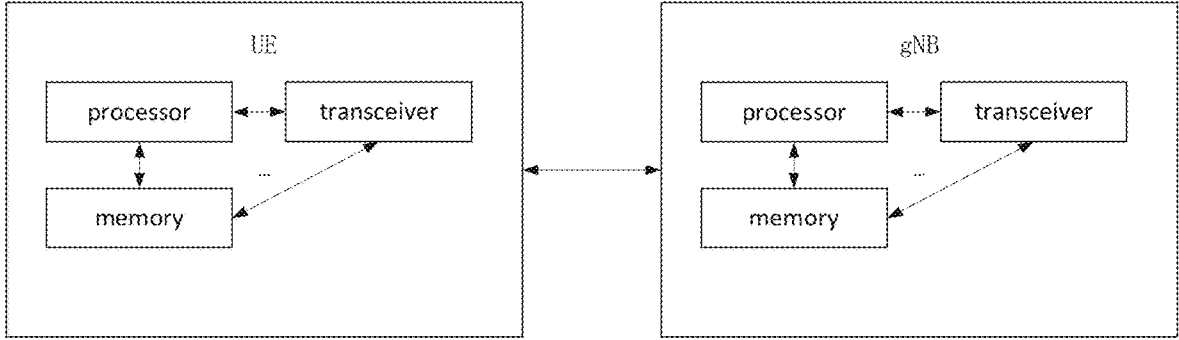

UE processor ◀┈▶ transceiver memory gNB processor ◀┈▶ transceiver memory

Figure 6

DYNAMIC COMMON BEAM SWITCHING FOR DL RECEPTION

FIELD

The subject matter disclosed herein generally relates to wireless communications, and more particularly relates to methods and apparatuses for dynamic common beam (or common TCI state) switching for DL reception.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN). Wide Area Network (WAN). User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/ Equipment (Mobile Terminal). Transmission Configuration Indication (TCI), quasi co-location (QCL), reference signal (RS), Demodulation RS (DM-RS), Physical Downlink Shared Channel (PDSCH), Physical Downlink Control Channel (PDCCH), Physical Uplink Shared Channel (PUSCH), Physical Uplink Control Channel (PUCCH), channel state information reference signal (CSI-RS), Medium Access Control (MAC), MAC control element (MAC CE), band width part (BWP), control resource set (CORESET), semi-persistent scheduling (SPS), subcarrier space (SCS), transmission reception point (TRP), multiple TRP (multi-TRP or M-TRP), multiple DCI (multi-DCI), Component Carrier (CC).

In NR Release 15 and Release 16, M (up to 128, which depends on UE capability) TCI states can be configured for a UE in a carrier (i.e. in a cell) by RRC signaling. For example, the TCI state is configured by the following RRC signaling:

---

TCI state
The IE TCI state associates one or two DL reference signals with a corresponding quasi-colocation (QCL) type.

---

TCI state information element

---

```
-- ASN1START
-- TAG-TCI STATE-START
TCI state ::=        SEQUENCE {
  TCI stateId         TCI stateId,
  qcl-Type1           QCL-Info,
  qcl-Type2           QCL-Info
OPTIONAL,   -- Need R
  ...
}
QCL-Info ::=         SEQUENCE {
  cell                ServCellIndex
OPTIONAL,   -- Need P
  bwp-Id              BWP-Id
OPTIONAL,   -- Cond CSI-R3-Indicated
  referenceSignal     CHOICE {
    csi-rs              NZP-CSI-RS-ResourceId,
    ssb                 SSB-Index
  },
  qcl-Type            ENUMERATED {typeA, typeB, typeC, typeD},
  ...
```

-continued

```
}
-- TAG-TCI STATE-STOP
-- ASN1STOP
```

---

Each TCI state contains parameters for configuring a quasi co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type 2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command (e.g. MAC CE) used to map up to 8 TCI states to the codepoints of the field 'Transmission Configuration Indication' (may be abbreviated as "TCI field") of a DL DCI (e.g. DCI format 1_1 or format 1_2) in one DL BWP of a serving cell. When a UE supports two TCI states in a codepoint of the TCI field, the UE may receive an activation command used to map up to 8 combinations of one or two TCI states to the codepoints of the TCI field.

The RX beam for receiving DL (e.g. PDSCH) transmission is determined by the QCL-TypeD RS configured in a TCI state, i.e., the UE uses the same spatial RX parameter for the reception of the DL transmission and the QCL-TypeD RS configured in the indicated TCI state. It can be seen that the beam for receiving PDSCH transmission can be dynamically indicated, which provides flexibility for DL scheduling. However, such dynamic beam indication causes higher signaling overhead and larger latency for beam updating. For example, a scheduling offset between the scheduling DCI and the scheduled PDSCH transmission should be equal to or larger than a threshold for RX beam preparation so that the UE can use the beam corresponding to the indicated TCI state to receive the scheduled PDSCH transmission. Otherwise (the scheduling offset is less than the threshold), a default beam is used for receiving the scheduled PDSCH transmission.

In view of the above, it is desirable that a common beam is used to receiving transmissions in all DL channels, at least for the same carrier or a set of carriers in a band, to reduce the signaling overhead and latency.

This invention discloses methods and apparatuses for dynamic common beam switching for receiving DL transmissions.

BRIEF SUMMARY

Methods and apparatuses for dynamic common beam (or common TCI state) switching for DL reception are disclosed.

In one embodiment, a method comprises receiving a higher layer parameter to enable common TCI state for DL reception for a serving cell: receiving a DCI with format 1_1 or 1_2 containing TCI field indicating a TCI state; and determining TCI state for DL reception according to the TCI state indicated by the TCI field of the DCI.

In one embodiment, when a scheduling offset between the reception of the DCI and a PDSCH transmission scheduled by the DCI is less than a threshold timeDurationForQCL, and when the TCI state indicated by the TCI field of the DCI is different from an old TCI state used for DL reception, the old TCI state is determined as the TCI state for receiving the scheduled PDSCH transmission. When the scheduling offset between the reception of the DCI and the PDSCH transmission scheduled by the DCI is equal to or larger than the threshold timeDurationForQCL, and when the TCI state indicated by the TCI field of the DCI is different from the old TCI state used for DL reception, the TCI state indicated in the TCI field of the DCI is determined as the TCI state for receiving the scheduled PDSCH transmission. When the TCI state indicated by the TCI field of the DCI is the same as the old TCI state for DL reception, the old TCI state is determined as the TCI state for receiving a PDSCH transmission scheduled by the DCI. Alternatively, the TCI state indicated in the TCI field of the DCI is determined as the TCI state for receiving the PDSCH transmission scheduled by the DCI, starting from the first slot that is Y symbols after the acknowledgment of the PDSCH transmission scheduled by the DCI, wherein Y is predetermined. The TCI state indicated in the TCI field of the DCI is determined as the TCI state for receiving PDCCH transmission from CORE-SET(s) other than CORESET #0, SPS-PDSCH transmission and PDSCH transmission scheduled by DL DCI without TCI field, starting from the first slot that is Y symbols after the acknowledgment of a PDSCH transmission scheduled by the DCI. The actual duration of Y symbols can be determined by a SCS configuration of the activated DL BWP for the PDCCH transmission carrying the DCI: or a SCS configuration of the activated UL BWP for a PUCCH or PUSCH transmission carrying the acknowledgment of the PDSCH transmission scheduled by the DCI.

In another embodiment, when the TCI field indicates a TCI codepoint pointing to two TCI states, the two TCI states only apply to dynamic scheduled PDSCH transmission and SPS-PDSCH transmission, while only the first indicated TCI state applies to the PDCCH transmission from CORESET(s) other than CORESET #0.

In some embodiment, if a higher layer parameter CORE-SETPoolIndex is configured for each CORESET, the TCI state indicated by the TCI field of the DCI only applies to PDSCH transmission scheduled by a DCI from a CORESET configured with the same CORESETPoolIndex configured for the CORESET transmitting the DCI: SPS-PDSCH transmission activated by a DCI from a CORESET configured with the same CORESETPoolIndex configured for the CORESET transmitting the DCI; and PDCCH transmission from a CORESET configured with the same CORESET-PoolIndex configured for the CORESET transmitting the DCI.

In some embodiment, the method may further comprise receiving a configuration of one or more cell lists each of which is composed of one or multiple serving cells, wherein common TCI state for DL reception is enabled for all serving cells in a cell list containing the serving cell. If a common TCI state change is indicated in the TCI field of a DCI format 1_1/1_2 on the serving cell with a serving cell index, when the serving cell index is configured as part of a cell list, the TCI state with the same ID indicated by the TCI field codepoint applies to all serving cells in the cell list. The TCI state indicated by the TCI field of the DCI applies to PDSCH transmission scheduled by DCI, SPS-PDSCH transmission activated by DCI and PDCCH transmission carrying DCI, starting from the first slot that is Y symbols after the acknowledgment of a PDSCH transmission scheduled by the DCI, wherein the actual duration of Y symbols is determined by the smallest of the SCS configurations of the active DL BWPs of all serving cells in the cell list.

In another embodiment, a remote unit comprises a receiver that receives a higher layer parameter to enable common TCI state for DL reception for a serving cell, and receives a DCI with format 1_1 or 1_2 containing TCI field indicating a TCI state; and a processor that determines TCI state for DL reception according to the TCI state indicated by the TCI field of the DCI.

In one embodiment, a method comprises transmitting a higher layer parameter to enable common TCI state for DL reception for a serving cell: transmitting a DCI with format 1_1 or 1_2 containing TCI field indicating a TCI state; and determining TCI state for DL reception according to the TCI state indicated by the TCI field of the DCI.

In yet another embodiment, a base unit comprises a transmitter that transmits a higher layer parameter to enable common TCI state for DL reception for a serving cell, and transmits a DCI with format 1_1 or 1_2 containing TCI field indicating a TCI state; and a processor that determines TCI state for DL reception according to the TCI state indicated by the TCI field of the DCI.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 3 illustrates an example of the common TCI activation/deactivation MAC CE;

FIG. 4 is a schematic flow chart diagram illustrating an embodiment of a method;

FIG. 5 is a schematic flow chart diagram illustrating a further embodiment of a method; and FIG. 6 is a schematic block diagram illustrating apparatuses according to one embodiment.

DETAILED DESCRIPTION

Figure 1:
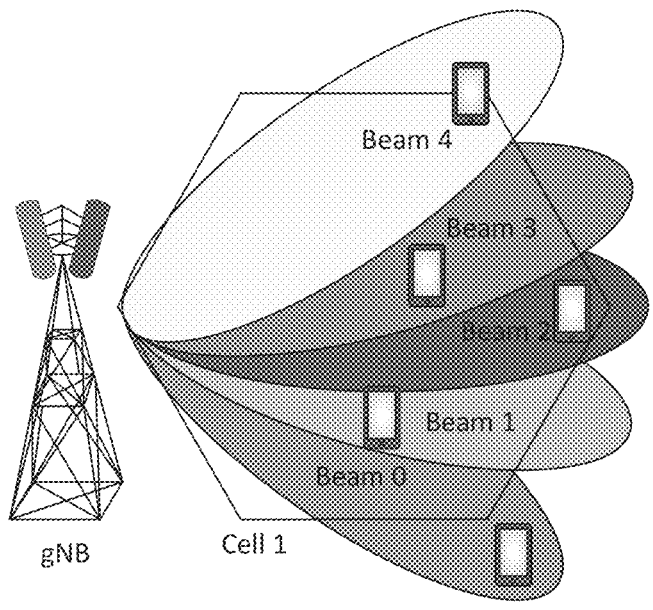
FIG. 1 illustrates multi-beam coverage for a cell.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python. Ruby, Java, Smalltalk. C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

FIG. 1 illustrates multi-beam coverage for a cell. As illustrated in FIG. 1, a serving cell 1 is covered by 5 different beams (i.e. Beam 0, Beam 1, Beam 2, Beam 3 and Beam 4) transmitted by the gNB. If a UE is located in the coverage area of a certain beam, it is reasonable for the UE to use the same beam for reception of DL control and data channel. For example, if the UE is in the coverage of Beam 2 shown in FIG. 1, the UE can receive all PDCCH transmissions from all CORESETs other than CORESET #0 (CORESET #0 can be used for system information scheduling with dedicated beam), and all PDSCH transmissions in all BWPs in a carrier for the cell using a common beam (i.e. Beam 2). Note that each CORESET identifies a set of time-frequency resources for PDCCH transmission, and that each BWP configures a partial band of a carrier with dedicated subcarrier space. When the UE moves from the coverage of one beam to the coverage of another beam, the common beam should also switch to the other beam. For example, when the UE moves from the coverage of Beam 2 to the coverage of Beam 3, the common beam for DL reception should switch to Beam 3 from Beam 2.

In order to implement the switch of the common beam (e.g. from Beam 2 to Beam 3) for DL reception, the following procedures are necessary: UE should be configured to support common beam for DL reception: the common beam (i.e. the changed common beam) should be indicated to the UE: the UE determines when the changed common beam applies, i.e. when the changed common beam is used for DL reception. As described in the background part, DL RX beam is indicated by the QCL-TypeD RS contained in the TCI state in FR2. In other words, a common beam can be unambiguously determined by a common TCI state. In the following description, common beam can be appropriated replaced by common TCI state. For example, the above-mentioned procedure can be represented by: UE should be configured to support common TCI state for DL reception; the common TCI state (i.e. the changed common TCI state) should be indicated to the UE; the UE determines when the changed common TCI state applies, i.e. when the changed common TCI state is used for DL reception.

According to a first embodiment, the network explicitly indicates that the UE supports common beam (common TCI state) for all DL channels. The indication can be made by a RRC parameter. For example, a higher layer parameter enableCommonBeamForDL or enableCommonTCIStateForDL can be set as 'enabled' to indicate the UE that common beam (common TCI state) for DL reception is configured. In particular, the UE receives from the network (e.g. gNB) the higher layer parameter enableCommonBeamForDL or enableCommonTCIStateForDL set as 'enabled' to enable common beam (common TCI state) for DL reception for a carrier. Since a cell (serving cell) uses a carrier, 'common beam (common TCI state) for DL reception for a carrier' equals to 'common beam (common TCI state) for DL reception for a serving cell', where the carrier is used by the serving cell.

According to a second embodiment, the common TCI state for all DL channels is indicated to the UE by a Transmission Configuration Indication (TCI) field contained in DCI (e.g. DCI format 1_1 or format 1_2). In particular, the common beam for all DL channels is determined by the QCL-TypeD RS configured in the TCI state indicated by the TCI field. In other words, the TCI state indicated by the TCI field is the common TCI state. The TCI field is optionally contained in DL DCI format 1_1 and 1_2. A higher layer parameter tci-PresentInDCI configures whether the TCI field is contained in DCI format 1_1 for a CORESET. When the higher layer parameter tci-PresentInDCI is set to 'enabled' for a CORESET, the TCI field is contained in DCI format 1_1 transmitted from the CORESET: while when the higher layer parameter tci-PresentInDCI is set to 'disabled' for a CORESET, the TCI field is not contained in DCI format 1_1 transmitted from the CORESET. A higher layer parameter tci-PresentDCI-1-2-r16 configures whether the TCI field is contained in DCI format 1_2 for a CORESET. When the higher layer parameter tci-PresentDCI-1-2-r16 is configured for a CORESET, the TCI field is contained in DCI format 1_2 transmitted from the CORESET: while when the higher layer parameter tci-PresentDCI-1-2-r16 is not configured for a CORESET, the TCI field is not contained in DCI format 1_2 transmitted from the CORESET.

In particular, at least for one CORESET, tci-PresentInDCI should be set as 'enabled' to indicate that TCI field is contained in the DCI format 1-1 transmitted from the one CORESET: or tci-PresentDCI-1-2-r16 should be configured to indicate that TCI field is contained in the DCI format 1-2 transmitted from the one CORESET. For other CORESETs, tci-PresentInDCI can be set as 'disabled', or tci-PresentDCI-1-2-r16 can be not configured.

As a whole, the TCI field shall be included in a DCI format 1_1 transmitted from at least one CORESET, or the TCI field shall be included in a DCI format 1_2 transmitted from at least one CORESET, so that the common TCI state for all DL channels can be indicated to the UE by the TCI field contained in DCI (DCI format 1_1 or 1_2) transmitted from the at least one CORESET.

According to a third embodiment, when the UE receives a DCI (e.g. DCI format 1_1 or format 1_2) containing the TCI field, the UE determines the TCI state for DL reception according to the TCI state indicated by the TCI field. In particular, the QCL-TypeD RS configured in the TCI state indicated by the TCI field determines the common beam for all DL channels. In short, the TCI field (if existing) contained in DCI format 1_1 or 1_2 indicates a new common TCI state for DL reception. DCI format 1_1 or 1_2 can also be used to schedule a PDSCH transmission.

When the UE uses the indicated common TCI state (referred to as "new TCI state") and when the UE uses previous used TCI state (referred to as "old TCI state") are determined as follows:

The DL data or signal can be classified as the following: (1) PDSCH transmission scheduled by DL DCI with TCI field: (2) PDSCH transmission scheduled by DL DCI without TCI field: (3) activated SPS-PDSCH transmission; and (4) PDCCH transmission from UE-specific CORESET, e.g. all CORESETs other than CORESET #0).

For (1) PDSCH scheduled by DL DCI with TCI field, there are three conditions:

(1-1) If the scheduling offset between the reception of the DL DCI indicating a common TCI state change. i.e., the indicated TCI state is different from the current TCI state used for PDCCH reception, and the PDSCH transmission scheduled by the DL DCI is less than a threshold timeDurationForQCL, the UE receives the scheduled PDSCH transmission using the old TCI state (that is used for the PDCCH reception).

(1-2) If the scheduling offset between the reception of the DL DCI indicating a common TCI state change, and the PDSCH transmission scheduled by the DL DCI is equal to or greater than the threshold timeDurationForQCL, the UE receives the scheduled PDSCH transmission using the common TCI state indicated by the TCI field (i.e. the new TCI state).

(1-3) If the DL DCI does not indicate a common TCI state change, i.e. the TCI field indicates a same common TCI state as the old TCI state, the UE receives the PDSCH transmission using the old TCI state (which is the same as the new TCI state) regardless of whether the scheduling offset between the DL DCI and the PDSCH transmission scheduled by the DL DCI is less than or equal to or greater than the threshold timeDurationForQCL.

The threshold timeDurationForQCL is pre-configured by a RRC signaling according to UE capability reporting.

For (2) PDSCH transmission scheduled by DL DCI without TCI field: (3) activated SPS-PDSCH transmission; and (4) PDCCH transmission from UE-specific CORESET, e.g. all CORESETs other than CORESET #0, the indicated common TCI state change is applied (i.e. the indicated common TCI state is used for reception), starting from the first slot that is Y symbols after the acknowledgment of the PDSCH transmission scheduled by the DCI indicating common TCI state change, wherein Y is predetermined, which means that Y is a fixed specified value or Y is configured by RRC parameter according to UE capability. Considering that different subcarrier spaces (SCSs) may be configured for different BWPs in a carrier, and that symbol durations corresponding to different SCSs are different, a specific SCS configuration should be determined to determine the actual duration of Y symbols for the application of the common TCI state. For example, when SCS=15 kHz is configured for the active DL BWP and SCS=30 kHz is configured for the active UL BWP, the symbol duration of a DL symbol is twice of the symbol duration of a UL symbol. It is necessary to specify the SCS used to determine the actual duration of Y symbols. Two alternative specific SCS configurations for determining the actual duration of Y symbols are proposed: 1) the SCS configuration of the activated DL BWP for the PDCCH reception carrying the DCI containing TCI field indicating common TCI state change; and 2) the SCS configuration of the activated UL BWP for the PUCCH or PUSCH transmission carrying the ACK corresponding to the PDSCH transmission scheduled by the DCI containing TCI field indicating common TCI state change.

In addition, for (4) PDCCH transmission from UE-specific CORESET, if a UE is configured with enableCommonBeamForDL or enableCommonTCIStateForDL set as 'enabled', the TCI state for PDCCH transmission does not need to be configured. That is, the higher layer parameter TCI statesPDCCH-ToAddList and TCI statesPDCCH-ToReleaseList in the controlResourceSet are not needed. In addition, TCI State Indication for UE-specific PDCCH MAC CE is not needed, either.

Figure 2:
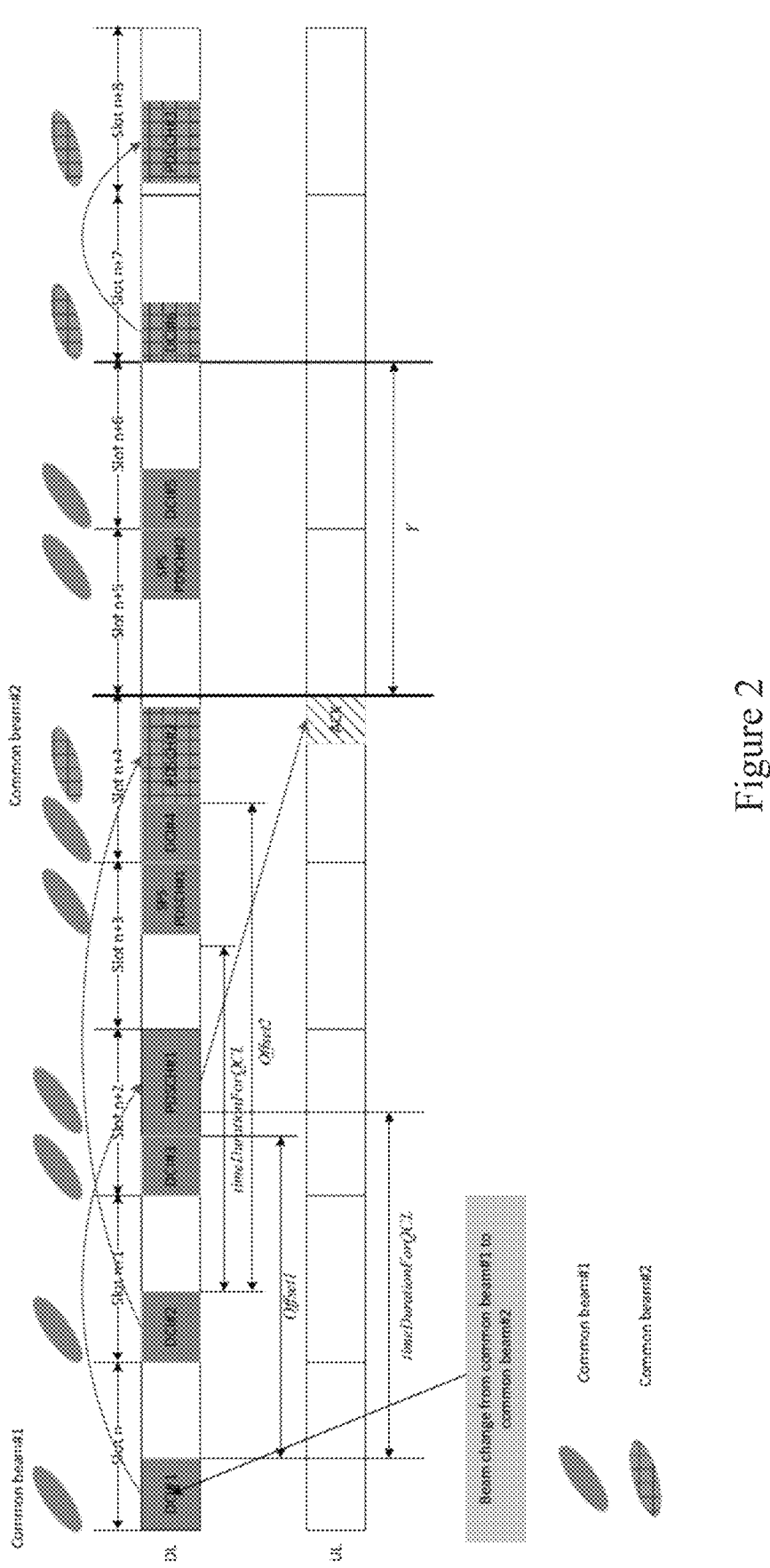
FIG. 2 illustrates an example for DCI based common beam switching.

FIG. 2 illustrates an example of DCI based common beam switching. Suppose M (up to 128) TCI states are configured for a UE in a carrier used by a cell by RRC signaling, and N (up to 8) out of them are activated by a dedicated MAC CE. A higher layer parameter enableCommonBeamForDL or enableCommonTCIStateForDL is configured and set as 'enabled'. The higher layer parameter TCI statesPDCCH-ToAddList and TCI statesPDCCH-ToReleaseList in the controlResourceSet are not configured for this UE. The higher layer parameter tci-PresentInDCI is set as 'enabled' for at least one CORESET, e.g., CORESET #1, configured in the current active BWP and tci-PresentInDCI is set as 'disabled' for the other CORESETs. Accordingly, the DCI with format 1_1 transmitted from CORESET #1 contains TCI field, while the DCI with format 1_1 transmitted from CORESET (s) other than CORESET #1 does not contain the TCI field. The TCI field contained in DCI format 1_1 transmitted from CORESET #1 indicates the common TCI state for DL reception.

As shown in FIG. 2, common beam #1 (i.e. old beam) is used as the common beam for DL reception before slot n. The UE detects a common beam change to common beam #2 (i.e. new beam) indicated by the TCI field contained in DCI #1 received in slot n. DCI #1 also schedules a PDSCH transmission PDSCH #1. The scheduling offset (Offset1) between DCI #1 and the scheduled PDSCH #1 is less than a threshold timeDurationForQCL. Therefore, the UE receives the scheduled PDSCH #1 using common beam #1 (i.e. old beam). On the other hand, the UE also detects a common beam change to common beam #2 (i.e. new beam) indicated by the TCI field contained in DCI #2 received in slot n+1. DCI #2 also schedules a PDSCH transmission PDSCH #2. The scheduling offset (Offset2) between DCI #2 and the scheduled PDSCH #2 is larger than the threshold timeDurationForQCL. Therefore, the UE receives the scheduled PDSCH #2 using common beam #2 (i.e. new beam). The UE reports the acknowledgment (ACK) of PDSCH #1 in slot n+4. The indicated common beam #2 (i.e. new beam) will be applied to (i.e. used for receiving) PDCCH transmission, SPS-PDSCH transmission, PDSCH transmission scheduled by DCI without TCI field, starting from slot n+7, i.e., the first slot that is Y symbols after the acknowledgment (the end of slot n+4, or the start of slot n+5) of the PDSCH transmission scheduled by the DCI (e.g. DCI #1) indicating a common TCI state change. The actual duration of Y symbols is determined by 1) the SCS configuration of the activated DL BWP for the PDCCH reception carrying the DCI (e.g. DCI #1) containing TCI field indicating common TCI state change: or 2) the SCS configuration of the activated UL BWP for the PUCCH or PUSCH transmission carrying the ACK corresponding to the PDSCH transmission scheduled by the DCI (e.g. DCI #1) containing TCI field indicating common TCI state change. In the example of FIG. 2, Y=28 symbols (equal to 2 slots). So, the common beam #1 (i.e. old beam) is still valid for all PDCCH transmission, SPS-PDSCH transmission, PDSCH transmission scheduled by DCI without TCI field before slot n+7. For example, as illustrated in FIG. 2, all of DCI #2 (in slot n+1), DCI #3 (in slot n+2), SPS-PDSCH #1 (in slot n+3), DCI #4 (in slot n+4). SPS-PDSCH #2 (in slot n+5), and DCI #5 (in slot n+6) are received by using common beam #1 (i.e. old beam).

On the other hand, for all PDCCH transmission, SPS-PDSCH transmission, PDSCH transmission scheduled by DCI without TCI field starting from slot n+7, the common beam #2 (i.e. new beam) is valid. For example, DCI #6 (in slot n+7) and PDSCH #3 (in slot n+8) are received by using common beam #2 (i.e. new beam).

In the above-described third embodiment, when the indicated common TCI state is used is differently determined for (1) PDSCH transmission scheduled by DL DCI with TCI field (determined according to the comparison between the scheduling offset and the threshold timeDurationForQCL); and for (2) PDSCH transmission scheduled by DL DCI without TCI field: (3) activated SPS-PDSCH transmission; and (4) PDCCH transmission from UE-specific CORESET, e.g. all CORESETs other than CORESET #0 (determined as starting from the first slot that is Y symbols after the acknowledgment of the PDSCH transmission scheduled by the DCI containing TCI field indicating common TCI state change).

Alternatively, according to a variety of the third embodiment, when the indicated common TCI state is used can be determined with the same criterion, i.e. the indicated common TCI state change is applied starting from the first slot that is Y symbols after the acknowledgment of the PDSCH scheduled by the DCI containing TCI field indicating common TCI state change, for all of the above-mentioned (1) to (4). In particular, the PDSCH transmission scheduled by DL DCI with TCI field, e.g. PDSCH #1 and PDSCH #2 shown in FIG. 2, will be received using common beam #1, as they are received before slot n+7 (the first slot that is Y symbols after the acknowledgment of the PDSCH transmission scheduled by DCI #1 containing TCI field indicating common TCI state change). It is unnecessary to compare the scheduling offset (Offset1 or Offset2) with the threshold timeDurationForQCL according to the variety of the third embodiment.

The common TCI state indication may apply to DL transmission in multi-TRP scenario (both single-DCI based multi-TRP and multi-DCI based multi-TRP).

A fourth embodiment describes the common TCI state indication in single-DCI based multi-TRP DL transmission.

In scenario of single-DCI based multi-TRP DL transmission, one DCI transmitted from one TRP may schedule a PDSCH transmission from different TRPs (e.g. two TRPs) using different beams (e.g. two beams) in FR2, where the two beams are indicated by one TCI codepoint contained in TCI field of the scheduling DCI.

According to the fourth embodiment, the network explicitly indicates that the UE supports common beam (common TCI state) for all DL channels, with the same manner as described in the first embodiment. That is, the UE receives from the network (e.g. gNB) the higher layer parameter enableCommonBeamForDL or enableCommonTCIStateForDL set as 'enabled' to enable common beam (common TCI state) for DL reception for a carrier (i.e. for a serving cell).

According to the fourth embodiment, the common TCI state for all DL channels is indicated by the TCI field contained in DCI (e.g. DCI format 1_1 or format 1_2), with substantially the same manner as described in the second embodiment. In the scenario of single TRP according to the second embodiment, the TCI state indicated by the TCI field includes one QCL-TypeD RS determining one common beam. In the scenario of single-DCI based multi-TRP, the TCI field of the DL DCI indicates a TCI codepoint that points to one or two TCI states, each of which includes one QCL-TypeD RS determining one common beam. That is, according to the fourth embodiment, one or two common TCI states can be indicated by the TCI field (TCI codepoint) in DCI format 1_1 or 1_2.

According to the fourth embodiment, when the UE receives a DCI (e.g. DCI format 1_1 or 1_2) containing the TCI field indicating a TCI codepoint, the UE determines the TCI state(s) for DL reception, with substantially the same manner as described in the third embodiment (or the variety of the third embodiment). In particular, when the TCI codepoint points to one TCI state (which means that the DCI schedules a PDSCH transmission from only one TRP), the UE determines the common TCI state for DL reception, with exactly the same manner as described in the third embodiment (or the variety of the third embodiment). When the TCI codepoint points to two TCI states (which means that the DCI schedules a PDSCH transmission from two TRPs such as TRP #1 and TRP #2), the UE determines the common beam for DL reception from TRP #1 by taking the beam determined by the QCL-TypeD RS included in the first TCI state pointed to by the TCI codepoint as the new beam (i.e. determines the common TCI state for DL reception from TRP #1 by taking the first TCI state pointed to by the TCI codepoint as the new TCI state), and determines the common beam for DL reception from TRP #2 by taking the beam determined by the QCL-TypeD RS included in the second TCI state pointed to by the TCI codepoint as the new beam (i.e. determines the common TCI state for DL reception from TRP #2 by taking the second TCI state pointed to by the TCI codepoint as the new TCI state), with substantially the same manner as described in the third embodiment (or the variety of the third embodiment). In particular, when the TCI codepoint points to two TCI states, the two TCI states (that determine two new beams) only apply to dynamic scheduled PDSCH transmission (i.e. PDSCH transmission scheduled by DCI) and SPS-PDSCH transmission, while only the first indicated TCI state (or the TCI state with lower TCI stateId among the two indicated TCI states) applies to PDCCH transmission from CORESET(s) other than CORESET #0. That is, the second indicated TCI state (or the TCI state with higher TCI stateId among the two indicated TCI states) does not apply to PDCCH transmission from CORESET(s) other than CORESET #0.

A fifth embodiment describes the common beam indication in multi-DCI based multi-TRP DL transmission.

In scenario of multi-DCI based multi-TRP DL transmission, a higher layer parameter CORESETPoolIndex can be configured for each CORESET for TRP differential, where CORESETPoolIndex=0 is configured for all CORESET(s) configured for one TRP (e.g. TRP #1) and CORESET-PoolIndex=1 is configured for all CORESET(s) configured for the other TRP (e.g. TRP #2). Each TRP may send a DL DCI scheduling a PDSCH transmission from this TRP or activating a SPS-PDSCH transmission from this TRP. Different TCI state pools can be configured in a carrier and be associated with different CORESETPoolIndex values, or a same TCI state pool is configured in a carrier and different TCI state subsets are activated for different CORESET-PoolIndex values.

According to the fifth embodiment, the network explicitly indicates that the UE supports common beam (common TCI state) for all DL channels, with the same manner as described in the first embodiment. That is, the UE receives from the network (e.g. gNB) the higher layer parameter enableCommonBeamForDL or enableCommonTCIStat-eForDL set as 'enabled' to enable common beam (common TCI state) for DL reception for a carrier (i.e. for a serving cell).

According to the fifth embodiment, the common TCI state for all DL channels is indicated by the TCI field contained in DCI (e.g. DCI format 1_1 or format 1_2), with substantially the same manner as described in the second embodiment. In the scenario of single TRP according to the second embodiment, the common TCI state indicated by the TCI field includes one QCL-TypeD RS determining one common beam. In the scenario of multi-DCI based multi-TRP, the TCI state indicated by the TCI field is TRP-specific. It means that the common TCI state indicated by TCI field in the DCI format 1_1 or 1_2 only applies to:

PDSCH transmission scheduled by DCI transmitted from CORESET(s) configured with the same CORESETPoolIndex configured for the CORESET transmitting the DCI format 1_1 or 1_2 containing TCI field indicating the common TCI state, where the PDSCH transmission can be scheduled by the DCI containing the TCI field indicating the common TCI state, or by DCI not containing the TCI field:

SPS-PDSCH transmission activated by DCI transmitted from CORESET(s) configured with the same CORESET-PoolIndex configured for the CORESET transmitting the DCI format 1_1 or 1_2 containing TCI field indicating the common TCI state, where the SPS-PDSCH transmission can be activated by the DCI containing TCI field indicating the common TCI state or by other DCI not containing the TCI field; and PDCCH transmitted from CORESET(s) configured with the same CORESETPoolIndex configured for the CORE-SET transmitting the DCI format 1_1 or 1_2 containing TCI field indicating the common TCI state.

According to the fifth embodiment, when the UE receives a DCI (e.g. DCI format 1_1 or 1_2) containing the TCI field indicating a TCI state, the UE TRP-specifically (i.e. for each of the multiple (e.g. two) TRPs) determines the TCI state for DL reception, with the same manner as described in the third embodiment (or the variety of the third embodiment). In this scenario, the higher layer parameter tci-PresentInDCI or tci-PresentDCI-1-2-r16 should be configured for at least two CORESETs configured with different CORESETPoolIndex values.

A sixth embodiment describes simultaneous DL common beam indication for multiple cells.

One or more cell lists, each of which contains multiple cells, can be configured for a UE for simultaneous common beam (or common TCI state) indication for multiple cells. For example, a UE is configured with 8 serving cells. Serving cells with indices 0, 1, 2 and 3 can be configured to belong to one cell list, e.g., simultaneousCommonbeam-UpdatedList1-r17, and serving cells with indices 4, 5, 6 and 7 can be configured to belong to another cell list, e.g., simultaneousCommonbeam-UpdatedList2-r17.

According to the sixth embodiment, the network explicitly indicates that the UE supports common beam (common TCI state) for all DL channels, with the same manner as described in the first embodiment. That is, the UE receives from the network (e.g. gNB) the higher layer parameter enableCommonBeamForDL or enableCommonTCIStat-eForDL set as 'enabled' to enable common beam (common TCI state) for DL reception for a carrier used by a serving cell with a serving cell index. When the serving cell index is configured as part of a cell list, simultaneous DL TCI state updating for all serving cells in the cell list is supported.

According to the sixth embodiment, the common TCI state for all DL channels is indicated by the TCI field contained in DCI (e.g. DCI format 1_1 or format 1_2), with the same manner as described in the second embodiment. If a common TCI state change is indicated in the TCI field of a DCI format 1_1 or 1_2 for a serving cell with a serving cell index, when the serving cell index is configured as part of a cell list, the common TCI state change applies to all serving cells in the cell list. That is, the TCI state with the same TCI stateId indicated in the TCI field of the DCI format 1_1 or 1_2 applies to all serving cells in the cell list.

When cell list(s) are configured, simultaneous DL TCI state updating for all serving cells in one cell list is supported. In particular, a common TCI activation/deactivation MAC CE is used to activate TCI states of all serving cells in a cell list, if the serving cell ID contained in the common TCI activation/deactivation MAC CE is configured as part of the cell list.

An example of the common TCI activation/deactivation MAC CE is illustrated in FIG. 3. Up to 128 TCI states can be configured for each serving cell. It has a variable size depending on the number of TCI states. When 128 TCI states are configured, N=17. The common TCI activation/deactivation MAC CE includes the following fields:

Serving Cell ID field: it indicates a serving cell for which the MAC CE applies.

$T_i$ field: each $T_i$ field indicates the activation or deactivation status of the TCI state with TCI stateId i. The $T_i$ field is set to 1 to indicate that the TCI state with TCI stateId i shall be activated and mapped to the codepoint of the DCI TCI field. The $T_i$ field is set to 0 to indicate that the TCI state with TCI stateId i shall be deactivated and is not mapped to the codepoint of the DCI TCI field. The codepoint to which the TCI State is mapped is determined by its ordinal position among all the TCI States with $T_i$ field set to 1, i.e. the first TCI State with $T_i$ field set to 1 shall be mapped to the codepoint value 0, the second TCI State with $T_i$ field set to 1 shall be mapped to the codepoint value 1 and so on. The maximum number of activated TCI states is 8.

For example, when a UE receives a common TCI activation/deactivation MAC CE that activates TCI states #2, #4, #6, #8, #10, #12, #14 and #16 (that is, $T_2$, $T_4$, $T_6$, $T_8$, $T_{10}$, $T_{12}$, $T_{14}$ and $T_{16}$ are set to 1, while other $T_i$ fields are set to 0) for serving cell 5. TCI states with IDs equal to 2, 4, 6, 8, 10, 12, 14 and 16 are activated for all serving cells 4, 5, 6 and 7 (serving cells 4, 5, 6 and 7 belong to one cell list. e.g. simultaneousCommonbeam-UpdatedList2-r17) and are mapped to TCI codepoints 0, 1, 2, 3, 4, 5, 6 and 7.

A DL TCI states pool can be configured for each serving cell by RRC signaling. Different DL TCI states pools may be configured for different serving cells (e.g. for serving cells 4, 5, 6 and 7). Therefore, the same TCI codepoint, which is mapped to the same TCI stateId, may point to different TCI states (as they can be activated from different TCI states pools).

If the UE receives a DCI containing a TCI field with 010 (i.e. the TCI codepoint is 2) indicating a common beam change in serving cell 7, the common TCI state #6 (that is mapped to TCI codepoint 2) is applied to all the BWPs of serving cells 4, 5, 6 and 7 (i.e. all serving cells in a cell list containing serving cell 7). It means that the UE shall apply TCI state #6 among all the TCI states configured on serving cells 4, 5, 6 and 7 for the PDCCH reception from CORESET (s) other than CORESET #0 in serving cells 4, 5, 6 and 7 and apply TCI state #6 among all TCI states configured for serving cells 4, 5, 6 and 7 for all PDSCH reception in serving cells 4, 5, 6 and 7. Incidentally, TCI state #6 may point to different TCI states in serving cells 4, 5, 6 and 7.

In the sixth embodiment, a further alternative SCS configuration for determining the actual duration of Y symbols is proposed: 3) the smallest of the SCS configurations of the active DL BWPs of all serving cells in the same cell list.

According to the sixth embodiment, when the UE receives a DCI (e.g. DCI format 1_1 or 1_2) containing the TCI field indicating a TCI state for one serving cell in a cell list, the UE determines the TCI state for DL reception for each of all serving cells in the cell list, with the same manner as described in the third embodiment (or the variety of the third embodiment).

FIG. 4 is a schematic flow chart diagram illustrating an embodiment of a method 400 according to the present application. In some embodiments, the method 400 is performed by an apparatus, such as a remote unit. In certain embodiments, the method 400 may be performed by a processor executing program code, for example, a microcontroller, a microprocessor, a CPU, a GPU, an auxiliary processing unit, a FPGA, or the like.

The method 400 may include 402 receiving a higher layer parameter to enable common TCI state for DL reception for a serving cell; 404 receiving a DCI with format 1_1 or 1_2 containing TCI field indicating a TCI state; and 406 determining TCI state for DL reception according to the TCI state indicated by the TCI field of the DCI.

When a scheduling offset between the reception of the DCI and a PDSCH transmission scheduled by the DCI is less than a threshold timeDurationForQCL, and when the TCI state indicated by the TCI field of the DCI is different from an old TCI state used for DL reception, the old TCI state is determined as the TCI state for receiving the scheduled PDSCH transmission. When the scheduling offset between the reception of the DCI and the PDSCH transmission scheduled by the DCI is equal to or larger than the threshold time DurationForQCL, and when the TCI state indicated by the TCI field of the DCI is different from the old TCI state used for DL reception, the TCI state indicated in the TCI field of the DCI is determined as the TCI state for receiving the scheduled PDSCH transmission. When the TCI state indicated by the TCI field of the DCI is the same as the old TCI state for DL reception, the old TCI state is determined as the TCI state for receiving a PDSCH transmission scheduled by the DCI. Alternatively, the TCI state indicated in the TCI field of the DCI is determined as the TCI state for receiving the PDSCH transmission scheduled by the DCI, starting from the first slot that is Y symbols after the acknowledgment of the PDSCH transmission scheduled by the DCI, wherein Y is predetermined. The TCI state indicated in the TCI field of the DCI is determined as the TCI state for receiving PDCCH transmission from CORESET(s) other than CORESET #0. SPS-PDSCH transmission and PDSCH transmission scheduled by DL DCI without TCI field, starting from the first slot that is Y symbols after the acknowledgment of a PDSCH transmission scheduled by the DCI.

The actual duration of Y symbols is determined by a SCS configuration of the activated DL BWP for the PDCCH transmission carrying the DCI: or a SCS configuration of the activated UL BWP for a PUCCH or PUSCH transmission carrying the acknowledgment of the PDSCH transmission scheduled by the DCI.

In single-DCI multi-TRP scenario, when the TCI field indicates a TCI codepoint pointing to two TCI states, the two TCI states only apply to dynamic scheduled PDSCH transmission and SPS-PDSCH transmission, while only the first indicated TCI state applies to the PDCCH transmission from CORESET(s) other than CORESET #0.

In multi-DCI multi-TRP if scenario, a higher layer parameter CORESETPoolIndex is configured for each CORESET, the TCI state indicated by the TCI field of the DCI only applies to PDSCH transmission scheduled by a DCI from a CORESET configured with the same CORESETPoolIndex configured for the CORESET transmitting the DCI: SPS-PDSCH transmission activated by a DCI from a CORESET configured with the same CORESETPoolIndex configured for the CORESET transmitting the DCI; and PDCCH transmission from a CORESET configured with the same CORESETPoolIndex configured for the CORESET transmitting the DCI.

The method may further comprise receiving a configuration of one or more cell lists each of which is composed of one or multiple serving cells, wherein common TCI state for DL reception is enabled for all serving cells in a cell list containing the serving cell. If a common TCI state change is indicated in the TCI field of a DCI format 1_1/1_2 on the serving cell with a serving cell index, when the serving cell index is configured as part of a cell list, the TCI state with the same ID indicated by the TCI field codepoint applies to all serving cells in the cell list. The TCI state indicated by the TCI field of the DCI applies to PDSCH transmission scheduled by DCI, SPS-PDSCH transmission activated by DCI and PDCCH transmission carrying DCI, starting from the first slot that is Y symbols after the acknowledgment of a PDSCH transmission scheduled by the DCI, wherein the actual duration of Y symbols is determined by the smallest of the SCS configurations of the active DL BWPs of all serving cells in the cell list.

FIG. 5 is a schematic flow chart diagram illustrating an embodiment of a method 500 according to the present application. In some embodiments, the method 500 is performed by an apparatus, such as a base unit. In certain embodiments, the method 500 may be performed by a processor executing program code, for example, a microcontroller, a microprocessor, a CPU, a GPU, an auxiliary processing unit, a FPGA, or the like.

The method 500 may include 502 transmitting a higher layer parameter to enable common TCI state for DL reception for a serving cell; 504 transmitting a DCI with format 1_1 or 1_2 containing TCI field indicating a TCI state; and 506 determining TCI state for DL reception according to the TCI state indicated by the TCI field of the DCI.

When a scheduling offset between the reception of the DCI and a PDSCH transmission scheduled by the DCI is less than a threshold timeDurationForQCL, and when the TCI state indicated by the TCI field of the DCI is different from an old TCI state used for DL reception, the old TCI state is determined as the TCI state for receiving the scheduled PDSCH transmission. When the scheduling offset between the reception of the DCI and the PDSCH transmission scheduled by the DCI is equal to or larger than the threshold timeDurationForQCL, and when the TCI state indicated by the TCI field of the DCI is different from the old TCI state used for DL reception, the TCI state indicated in the TCI field of the DCI is determined as the TCI state for receiving the scheduled PDSCH transmission. When the TCI state indicated by the TCI field of the DCI is the same as the old TCI state for DL reception, the old TCI state is determined as the TCI state for receiving a PDSCH transmission scheduled by the DCI. Alternatively, the TCI state indicated in the TCI field of the DCI is determined as the TCI state for receiving the PDSCH transmission scheduled by the DCI, starting from the first slot that is Y symbols after the acknowledgment of the PDSCH transmission scheduled by the DCI, wherein Y is predetermined. The TCI state indicated in the TCI field of the DCI is determined as the TCI state for receiving PDCCH transmission from CORESET(s) other than CORESET #0, SPS-PDSCH transmission and PDSCH transmission scheduled by DL DCI without TCI field, starting from the first slot that is Y symbols after the acknowledgment of a PDSCH transmission scheduled by the DCI.

The actual duration of Y symbols is determined by a SCS configuration of the activated DL BWP for the PDCCH transmission carrying the DCI; or a SCS configuration of the activated UL BWP for a PUCCH or PUSCH transmission carrying the acknowledgment of the PDSCH transmission scheduled by the DCI.

In single-DCI multi-TRP scenario, when the TCI field indicates a TCI codepoint pointing to two TCI states, the two TCI states only apply to dynamic scheduled PDSCH transmission and SPS-PDSCH transmission, while only the first indicated TCI state applies to the PDCCH transmission from CORESET(s) other than CORESET #0.

In multi-DCI multi-TRP scenario, if a higher layer parameter CORESETPoolIndex is configured for each CORESET, the TCI state indicated by the TCI field of the DCI only applies to PDSCH transmission scheduled by a DCI from a CORESET configured with the same CORESETPoolIndex configured for the CORESET transmitting the DCI: SPS-PDSCH transmission activated by a DCI from a CORESET configured with the same CORESETPoolIndex configured for the CORESET transmitting the DCI; and PDCCH transmission from a CORESET configured with the same CORESETPoolIndex configured for the CORESET transmitting the DCI.

The method may further comprise transmitting a configuration of one or more cell lists each of which is composed of one or multiple serving cells, wherein common TCI state for DL reception is enabled for all serving cells in a cell list containing the serving cell. If a common TCI state change is indicated in the TCI field of a DCI format 1_1/1_2 on the serving cell with a serving cell index, when the serving cell index is configured as part of a cell list, the TCI state with the same ID indicated by the TCI field codepoint applies to all serving cells in the cell list. The TCI state indicated by the TCI field of the DCI applies to PDSCH transmission scheduled by DCI. SPS-PDSCH transmission activated by DCI and PDCCH transmission carrying DCI, starting from the first slot that is Y symbols after the acknowledgment of a PDSCH transmission scheduled by the DCI, wherein the actual duration of Y symbols is determined by the smallest of the SCS configurations of the active DL BWPs of all serving cells in the cell list.

FIG. 6 is a schematic block diagram illustrating apparatuses according to one embodiment.

Referring to FIG. 6, the UE (i.e. the remote unit) includes a processor, a memory, and a transceiver. The processor implements a function, a process, and/or a method which are proposed in FIG. 4.

The remote unit comprises a receiver that receives a higher layer parameter to enable common TCI state for DL reception for a serving cell, and receives a DCI with format 1_1 or 1_2 containing TCI field indicating a TCI state; and a processor that determines TCI state for DL reception according to the TCI state indicated by the TCI field of the DCI.

When a scheduling offset between the reception of the DCI and a PDSCH transmission scheduled by the DCI is less than a threshold timeDurationForQCL, and when the TCI state indicated by the TCI field of the DCI is different from an old TCI state used for DL reception, the old TCI state is determined as the TCI state for receiving the scheduled PDSCH transmission. When the scheduling offset between the reception of the DCI and the PDSCH transmission scheduled by the DCI is equal to or larger than the threshold timeDurationForQCL, and when the TCI state indicated by the TCI field of the DCI is different from the old TCI state used for DL reception, the TCI state indicated in the TCI field of the DCI is determined as the TCI state for receiving the scheduled PDSCH transmission. When the TCI state indicated by the TCI field of the DCI is the same as the old TCI state for DL reception, the old TCI state is determined as the TCI state for receiving a PDSCH transmission scheduled by the DCI. Alternatively, the TCI state indicated in the TCI field of the DCI is determined as the TCI state for receiving the PDSCH transmission scheduled by the DCI, starting from the first slot that is Y symbols after the acknowledgment of the PDSCH transmission scheduled by the DCI, wherein Y is predetermined. The TCI state indicated in the TCI field of the DCI is determined as the TCI state for receiving PDCCH transmission from CORESET(s) other than CORESET #0, SPS-PDSCH transmission and PDSCH transmission scheduled by DL DCI without TCI field, starting from the first slot that is Y symbols after the acknowledgment of a PDSCH transmission scheduled by the DCI.

The actual duration of Y symbols is determined by a SCS configuration of the activated DL BWP for the PDCCH transmission carrying the DCI; or a SCS configuration of the activated UL BWP for a PUCCH or PUSCH transmission carrying the acknowledgment of the PDSCH transmission scheduled by the DCI.

In single-DCI multi-TRP scenario, when the TCI field indicates a TCI codepoint pointing to two TCI states, the two TCI states only apply to dynamic scheduled PDSCH transmission and SPS-PDSCH transmission, while only the first indicated TCI state applies to the PDCCH transmission from CORESET(s) other than CORESET #0.

In multi-DCI multi-TRP scenario, if a higher layer parameter CORESETPoolIndex is configured for each CORESET, the TCI state indicated by the TCI field of the DCI only applies to PDSCH transmission scheduled by a DCI from a CORESET configured with the same CORESETPoolIndex configured for the CORESET transmitting the DCI: SPS-PDSCH transmission activated by a DCI from a CORESET configured with the same CORESETPoolIndex configured for the CORESET transmitting the DCI; and PDCCH transmission from a CORESET configured with the same CORESETPoolIndex configured for the CORESET transmitting the DCI.

The receiver may further receive a configuration of one or more cell lists each of which is composed of one or multiple serving cells, wherein common TCI state for DL reception is enabled for all serving cells in a cell list containing the serving cell. If a common TCI state change is indicated in the TCI field of a DCI format 1_1/1_2 on the serving cell with a serving cell index, when the serving cell index is configured as part of a cell list, the TCI state with the same ID indicated by the TCI field codepoint applies to all serving cells in the cell list. The TCI state indicated by the TCI field of the DCI applies to PDSCH transmission scheduled by DCI, SPS-PDSCH transmission activated by DCI and PDCCH transmission carrying DCI, starting from the first slot that is Y symbols after the acknowledgment of a PDSCH transmission scheduled by the DCI, wherein the actual duration of Y symbols is determined by the smallest of the SCS configurations of the active DL BWPs of all serving cells in the cell list.

The gNB (i.e. base unit) includes a processor, a memory, and a transceiver. The processors implement a function, a process, and/or a method which are proposed in FIG. 5.

The base unit comprises a transmitter that transmits a higher layer parameter to enable common TCI state for DL reception for a serving cell, and transmits a DCI with format 1_1 or 1_2 containing TCI field indicating a TCI state; and a processor that determines TCI state for DL reception according to the TCI state indicated by the TCI field of the DCI.

When a scheduling offset between the reception of the DCI and a PDSCH transmission scheduled by the DCI is less than a threshold timeDurationForQCL, and when the TCI state indicated by the TCI field of the DCI is different from an old TCI state used for DL reception, the old TCI state is determined as the TCI state for receiving the scheduled PDSCH transmission. When the scheduling offset between the reception of the DCI and the PDSCH transmission scheduled by the DCI is equal to or larger than the threshold timeDurationForQCL, and when the TCI state indicated by the TCI field of the DCI is different from the old TCI state used for DL reception, the TCI state indicated in the TCI field of the DCI is determined as the TCI state for receiving the scheduled PDSCH transmission. When the TCI state indicated by the TCI field of the DCI is the same as the old TCI state for DL reception, the old TCI state is determined as the TCI state for receiving a PDSCH transmission scheduled by the DCI. Alternatively, the TCI state indicated in the TCI field of the DCI is determined as the TCI state for receiving the PDSCH transmission scheduled by the DCI, starting from the first slot that is Y symbols after the acknowledgment of the PDSCH transmission scheduled by the DCI, wherein Y is predetermined. The TCI state indicated in the TCI field of the DCI is determined as the TCI state for receiving PDCCH transmission from CORESET(s) other than CORESET #0, SPS-PDSCH transmission and PDSCH transmission scheduled by DL DCI without TCI field, starting from the first slot that is Y symbols after the acknowledgment of a PDSCH transmission scheduled by the DCI.

The actual duration of Y symbols is determined by a SCS configuration of the activated DL BWP for the PDCCH transmission carrying the DCI: or a SCS configuration of the activated UL BWP for a PUCCH or PUSCH transmission carrying the acknowledgment of the PDSCH transmission scheduled by the DCI.

In single-DCI multi-TRP scenario, when the TCI field indicates a TCI codepoint pointing to two TCI states, the two TCI states only apply to dynamic scheduled PDSCH transmission and SPS-PDSCH transmission, while only the first indicated TCI state applies to the PDCCH transmission from CORESET(s) other than CORESET #0.

In multi-DCI multi-TRP scenario, if a higher parameter CORESETPoolIndex is configured for each CORESET, the TCI state indicated by the TCI field of the DCI only applies to PDSCH transmission scheduled by a DCI from a CORE-SET configured with the same CORESETPoolIndex configured for the CORESET transmitting the DCI: SPS-PDSCH transmission activated by a DCI from a CORESET configured with the same CORESETPoolIndex configured for the CORESET transmitting the DCI; and PDCCH transmission from a CORESET configured with the same CORESET-PoolIndex configured for the CORESET transmitting the DCI.

The transmitter may further transmit a configuration of one or more cell lists each of which is composed of one or multiple serving cells, wherein common TCI state for DL reception is enabled for all serving cells in a cell list containing the serving cell. If a common TCI state change is indicated in the TCI field of a DCI format 1_1/1_2 on the serving cell with a serving cell index, when the serving cell index is configured as part of a cell list, the TCI state with the same ID indicated by the TCI field codepoint applies to all serving cells in the cell list. The TCI state indicated by the TCI field of the DCI applies to PDSCH transmission scheduled by DCI. SPS-PDSCH transmission activated by DCI and PDCCH transmission carrying DCI, starting from the first slot that is Y symbols after the acknowledgment of a PDSCH transmission scheduled by the DCI, wherein the actual duration of Y symbols is determined by the smallest of the SCS configurations of the active DL BWPs of all serving cells in the cell list.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving a higher layer parameter to enable a common transmission configuration indication (TCI) state for downlink (DL) reception for a serving cell;

receiving a downlink control information (DCI) that indicates a TCI state for the DL reception starting at a slot that is a numerical quantity of symbols after an acknowledgment of a physical downlink shared channel (PDSCH) transmission scheduled by the DCI; and performing, based at least in part on the higher layer parameter and the TCI state, the DL reception the numerical quantity of symbols after the acknowledgment of the PDSCH transmission.

2. The method of claim 1, further comprising receiving, based at least in part on a previous TCI state used for an additional DL reception, the PDSCH transmission, wherein a scheduling offset between the DCI and the PDSCH transmission is less than a threshold timeDurationForQCL, and wherein the TCI state indicated by the DCI is different from the previous TCI state.

3. The method of claim 1, further comprising receiving, based at least in part on the TCI state indicated by the DCI, the PDSCH transmission, wherein a scheduling offset between the DCI and the PDSCH transmission is equal to or greater than a threshold time DurationForQCL, and wherein the TCI state indicated by the DCI is different from a previous TCI state used for an additional DL reception.

4. The method of claim 1, further comprising receiving the PDSCH transmission based at least in part on a previous TCI state for an additional DL reception, wherein the TCI state indicated by the DCI is a same TCI state as the previous TCI state.

5. The method of claim 1, wherein performing the DL reception further comprises receiving an additional PDSCH transmission based at least in part on the TCI state indicated by the DCI, wherein the additional PDSCH transmission is at least one of from one or more control resource sets (CORESETs) other than a CORESET #0, a semi-persistent scheduling (SPS)-PDSCH transmission, or scheduled by an additional DCI without a TCI field.

6. The method of claim 1, wherein the DCI indicates a TCI codepoint pointing to two TCI states, and wherein the method further comprises:

applying the two TCI states to at least one of a dynamic scheduled PDSCH transmission or a semi-persistent scheduling (SPS)-PDSCH transmission; and applying a first TCI state of the two TCI states to a physical downlink control channel (PDCCH) transmission from one or more control resource sets (CORESETs) other than a CORESET #0.

7. A user equipment (UE) for wireless communications, comprising:

at least one memory; and at least one processor coupled with the at least one memory and operable to cause the UE to:

receive a higher layer parameter to enable a common transmission configuration indication (TCI) state for downlink (DL) reception for a serving cell;

receive a downlink control information (DCI) that indicates a TCI state for the DL reception starting at a slot that is a numerical quantity of symbols after an acknowledgment of a physical downlink shared channel (PDSCH) transmission scheduled by the DCI; and perform, based at least in part on the higher layer parameter and the TCI state, the DL reception the numerical quantity of symbols after the acknowledgment of the PDSCH transmission.

8. The UE of claim 7, wherein the at least one processor is further operable to cause the UE to receive, based at least in part on a previous TCI state used for an additional DL reception, the PDSCH transmission, wherein a scheduling offset between the DCI and the PDSCH transmission is less than a threshold timeDurationForQCL, and wherein the TCI state indicated by the DCI is different from the previous TCI state.

9. The UE of claim 7, wherein the at least one processor is further operable to cause the UE to receive, based at least in part on the TCI state indicated by the DCI, the PDSCH transmission, wherein a scheduling offset between the DCI and the PDSCH transmission is equal to or greater than a threshold timeDurationForQCL, and wherein the TCI state indicated by the DCI is different from a previous TCI state used for an additional DL reception.

10. The UE of claim 7, wherein the at least one processor is further operable to cause the UE to receive the PDSCH transmission based at least in part on a previous TCI state for an additional DL reception, wherein the TCI state indicated by the DCI is a same TCI state as the previous TCI state.

11. The UE of claim 7, wherein to perform the DL reception, the at least one processor is operable to cause the UE to receive an additional PDSCH transmission based at least in part on the TCI state indicated by the DCI, wherein the additional PDSCH transmission is at least one of from one or more control resource sets (CORESETs) other than a CORESET #0, a semi-persistent scheduling (SPS)-PDSCH transmission, or scheduled by an additional DCI without a TCI field.

12. The UE of claim 7, wherein the at least one processor is further operable to cause the UE to receive the PDSCH transmission based at least in part on the TCI state indicated by the DCI, wherein the numerical quantity of symbols is predetermined.

13. The UE of claim 12, wherein an actual duration of the numerical quantity of symbols is based at least in part on at least one of a first subcarrier space (SCS) configuration of an activated DL bandwidth part (BWP) for a physical downlink control channel (PDCCH) transmission carrying the DCI or a second SCS configuration of an activated uplink (UL) BWP for a physical uplink control channel (PUCCH) or a physical uplink shared channel (PUSCH) transmission carrying the acknowledgment.

14. The UE of claim 7, wherein the DCI indicates a TCI codepoint pointing to two TCI states, and wherein the at least one processor is further operable to cause the UE to:

apply the two TCI states to at least one of a dynamic scheduled PDSCH transmission or a semi-persistent scheduling (SPS)-PDSCH transmission; and apply a first TCI state of the two TCI states to a physical downlink control channel (PDCCH) transmission from one or more control resource sets (CORESETs) other than a CORESET #0.

15. The UE of claim 7, wherein an additional higher layer parameter CORESETPoolIndex is configured for each of one or more control resource sets (CORESETs), and wherein the at least one processor is further operable to cause the UE to apply the TCI state indicated by the DCI to:

an additional PDSCH transmission scheduled by an additional DCI from a first CORESET configured with a same CORESETPoolIndex configured for a second CORESET transmitting the additional DCI;

a semi-persistent scheduling (SPS)-PDSCH transmission activated by the additional DCI from a third CORESET configured with the same CORESETPoolIndex configured for the second CORESET transmitting the additional DCI; and a physical downlink control channel (PDCCH) transmission from a fourth CORESET configured with the same CORESETPoolIndex configured for the second CORESET transmitting the additional DCI.

16. The UE of claim 7, wherein the at least one processor is further operable to cause the UE to receive a configuration of one or more cell lists comprising one or more respective serving cells, wherein the common TCI state for DL reception is enabled for the one or more respective serving cells in a cell list of the one or more cell lists.

17. The UE of claim 16, wherein the at least one processor is further operable to cause the UE to apply, based at least in part on the DCI comprising an identifier corresponding to the TCI state, the TCI state to the one or more respective serving cells in the cell list, wherein a common TCI state change is indicated in the DCI on a serving cell with a serving cell index, and wherein the serving cell index is part of the cell list.

18. The UE of claim 17, wherein to perform the DL reception, the at least one processor is operable to cause the UE to apply the TCI state indicated by the DCI to one or more of an additional PDSCH transmission scheduled by a first additional DCI, a semi-persistent scheduling (SPS)-PDSCH transmission activated by a second additional DCI, or a physical downlink control channel (PDCCH) transmission carrying a third additional DCI, wherein an actual duration of the numerical quantity of symbols is based at least in part on a smallest of one or more subcarrier spacing (SCS) configurations of active DL bandwidth parts (BWPs) of the one or more respective serving cells in the cell list.

19. A network equipment (NE) for wireless communications, comprising:

at least one memory; and at least one processor coupled with the at least one memory and operable to cause the NE to:

transmit a higher layer parameter to enable a common transmission configuration indication (TCI) state for downlink (DL) reception at a user equipment (UE); and transmit a downlink control information (DCI) that indicates a TCI state for the DL reception starting at a slot that is a numerical quantity of symbols after an acknowledgment of a physical downlink shared channel (PDSCH) transmission scheduled by the DCI.

20. A method performed by a network equipment (NE), the method comprising:

transmitting a higher layer parameter to enable a common transmission configuration indication (TCI) state for downlink (DL) reception at a user equipment (UE); and transmitting a downlink control information (DCI) that indicates a TCI state for the DL reception starting at a slot that is a numerical quantity of symbols after an acknowledgment of a physical downlink shared channel (PDSCH) transmission scheduled by the DCI.

* * * * *